(12) United States Patent
Tillotson

(10) Patent No.: US 7,997,532 B2
(45) Date of Patent: Aug. 16, 2011

(54) AIRBORNE POWER STATION

(75) Inventor: Brian J. Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 656 days.

(21) Appl. No.: 12/128,561

(22) Filed: May 28, 2008

(65) Prior Publication Data

US 2009/0229656 A1    Sep. 17, 2009

Related U.S. Application Data

(63) Continuation-in-part of application No. 12/049,234, filed on Mar. 14, 2008.

(51) Int. Cl.
*B64B 1/00* (2006.01)
*B64D 41/00* (2006.01)
*B64B 1/18* (2006.01)

(52) U.S. Cl. ........ 244/127; 244/172.7; 244/30; 244/126

(58) Field of Classification Search .................. 244/1 A, 244/158.3, 172.7, 172.8, 24, 30, 31, 32, 33, 244/58, 59, 60, 96, 116, 126, 127; 446/33, 446/225; 136/292; 320/DIG. 33
See application file for complete search history.

(56) References Cited

U.S. PATENT DOCUMENTS

| | | | | |
|---|---|---|---|---|
| 3,184,742 A * | 5/1965 | Cutler | ........................ | 244/158.3 |
| 4,361,295 A * | 11/1982 | Wenzel | ........................... | 244/33 |
| 4,364,532 A * | 12/1982 | Stark | ............................... | 244/30 |
| 5,645,248 A * | 7/1997 | Campbell | ........................ | 244/30 |
| 6,919,847 B2 * | 7/2005 | Caplan et al. | ................. | 343/705 |
| 7,068,991 B2 * | 6/2006 | Parise | ........................ | 455/343.1 |

OTHER PUBLICATIONS

Sasaki, S. et al. (Mar. 2004). Tethered Solar Power Satellite. JAXA Research and Development Report, RR-03-005E.*
Reuters, "Solar Power from Balloons? Scientists test idea", www.msnbc.msn.com/id/24012079/, Apr. 8, 2008.

* cited by examiner

*Primary Examiner* — Tien Dinh
*Assistant Examiner* — Richard R Green
(74) *Attorney, Agent, or Firm* — Caven & Aghevli LLC

(57) ABSTRACT

A system for generating power from sunlight collected substantially above the earth's surface comprises an airborne platform which supports an apparatus to collect sunlight, an apparatus to convert sunlight to electricity, and an apparatus to transmit the electricity to a selected location on the earth's surface. The airborne platform collects solar energy above the clouds and transmits the energy to a receiving station on the ground via a microwave transmission system, avoiding possible attenuating effects of clouds and pollution.

17 Claims, 15 Drawing Sheets

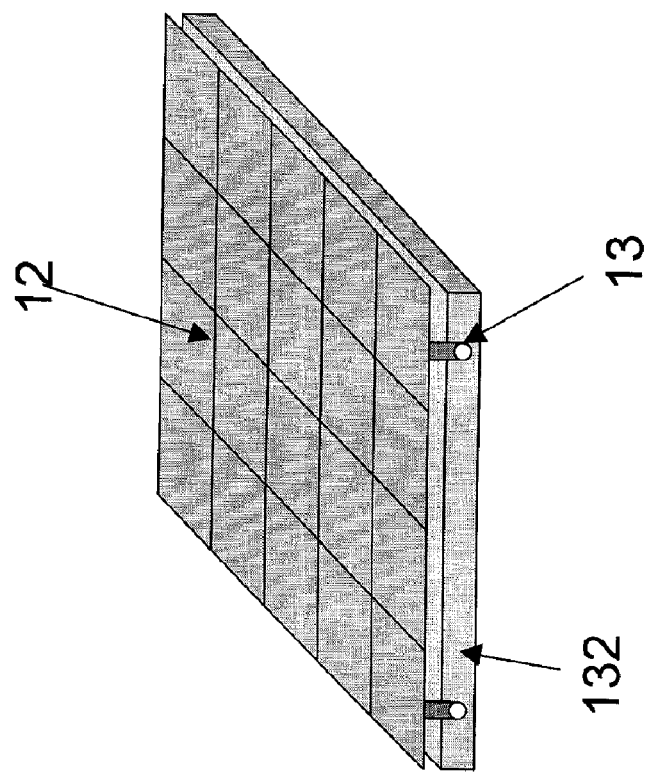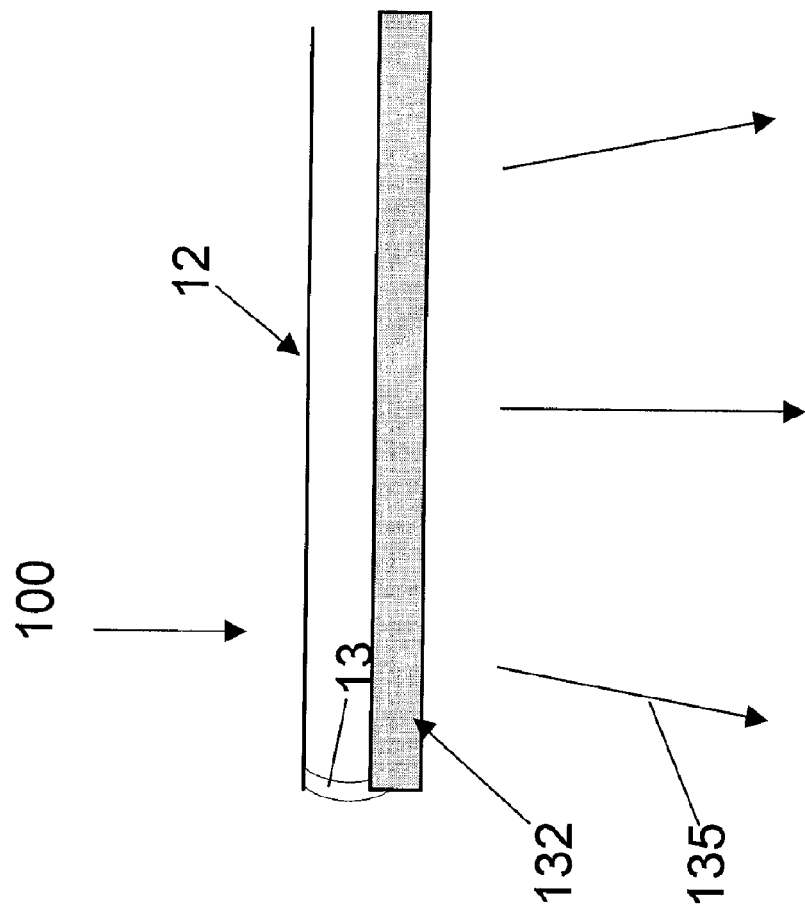

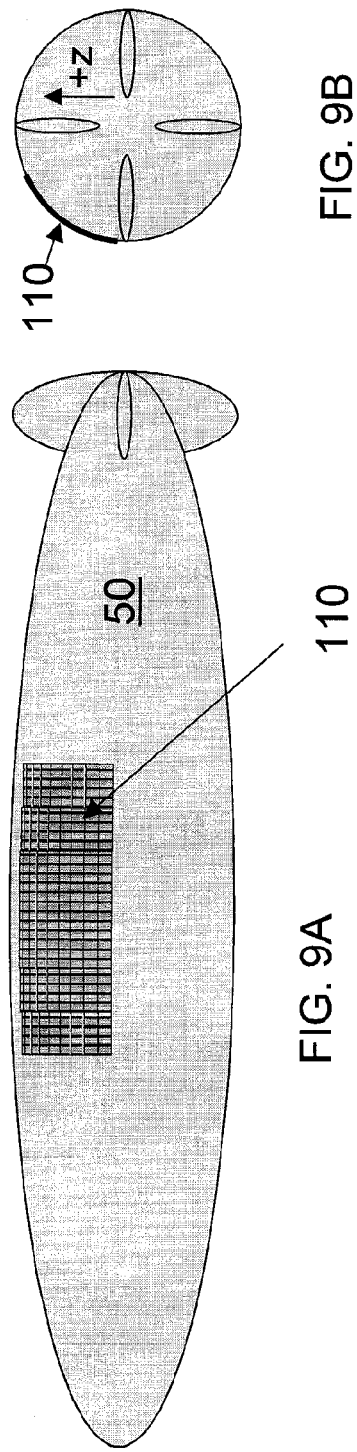
FIG. 9A
FIG. 9B
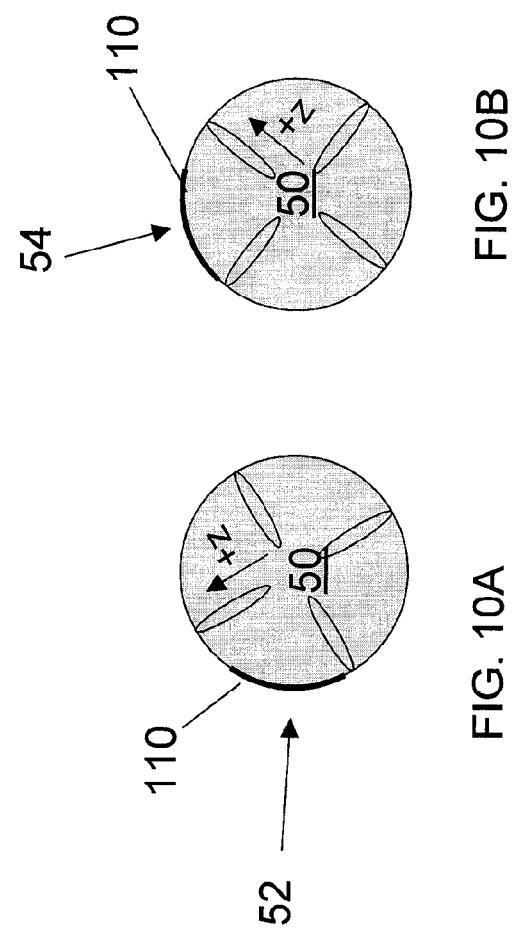
FIG. 10A
FIG. 10B

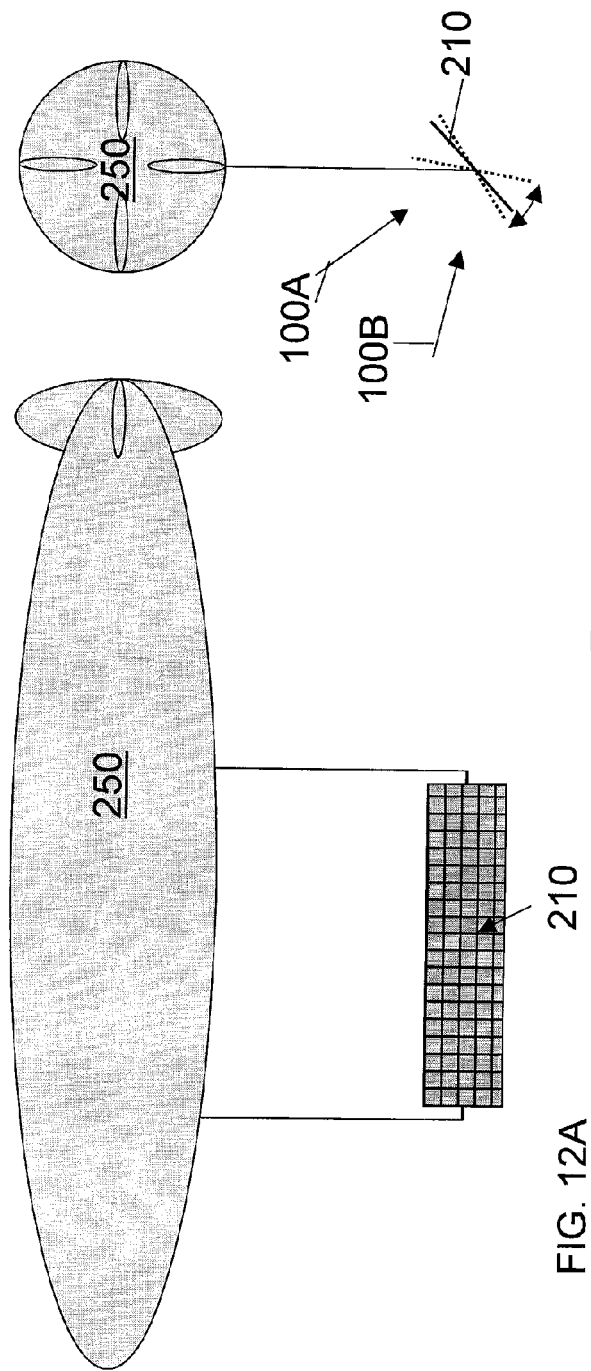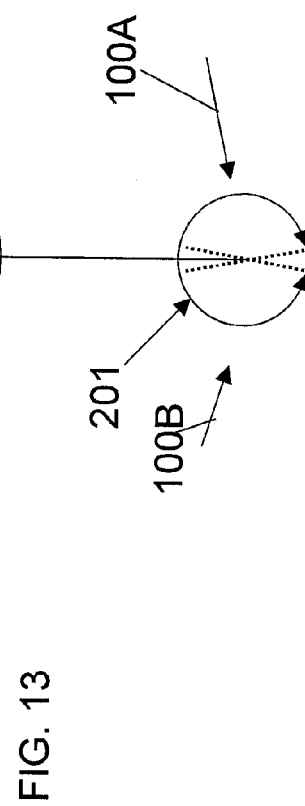
FIG. 12A
FIG. 12B
FIG. 13

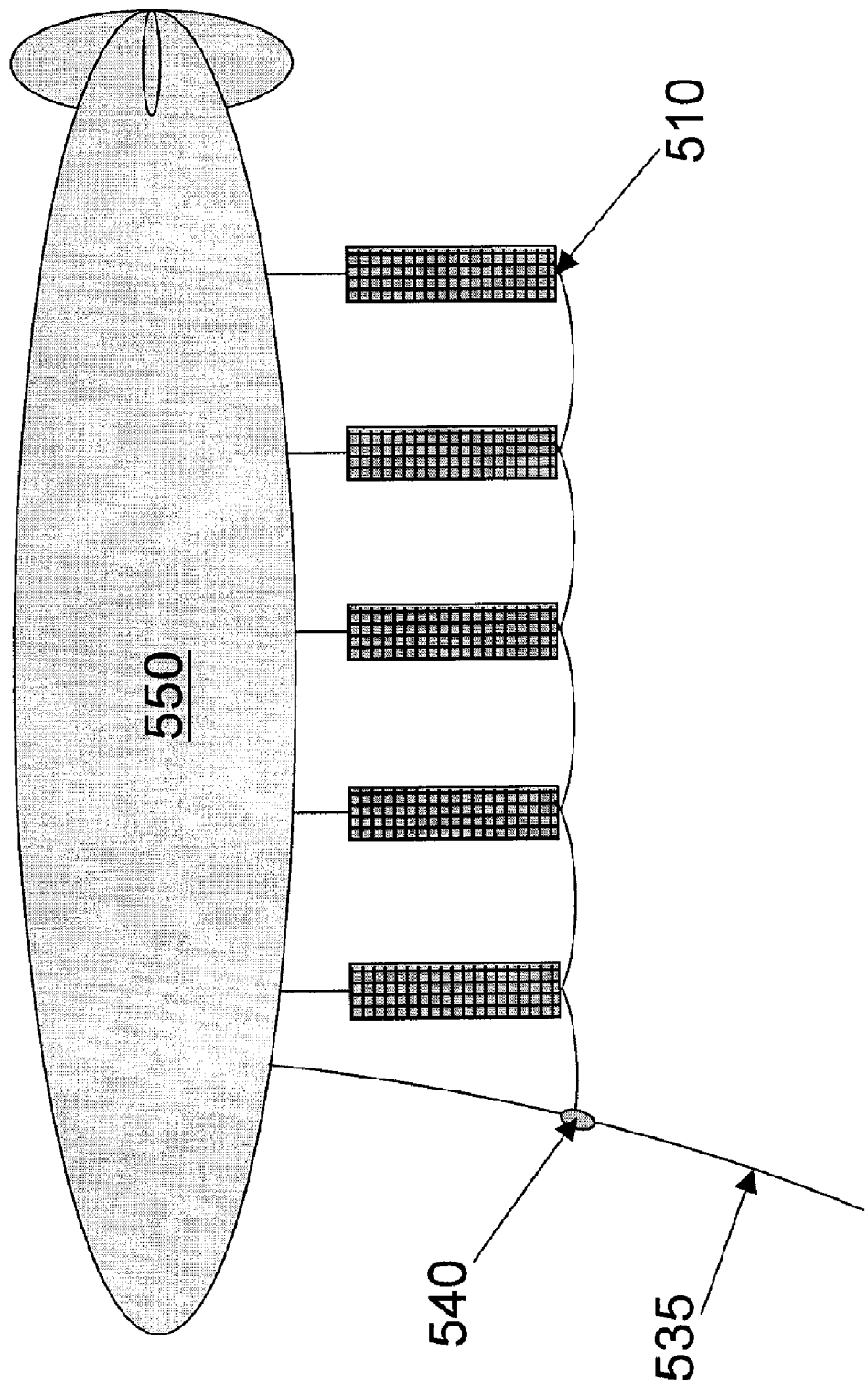

AIRBORNE POWER STATION

CROSS REFERENCE TO RELATED APPLICATIONS

The present application is a continuation-in-part of U.S. application Ser. No. 12/049,234, filed Mar. 14, 2008, the contents of which are incorporated herein by reference.

FIELD

The present disclosure is generally related to an apparatus and method for conversion of solar energy to electricity, more particularly, is related to the deployment of solar cell arrays for maximum utilization.

BACKGROUND

There is currently a large domestic and international market for clean non-polluting generated grid and remote electrical power, such as the electrical power generated by solar energy generating systems. This demand is anticipated only to grow.

Terrestrial solar power systems typically are formed of flat panel photovoltaic (PV) cells, concentrator PV cell systems, or concentrator turbogenerators. Flat panel PV cell systems are advantageous in that they convert either direct or diffuse sunlight to electricity, though direct sunlight is preferred. The panels usually are stationary and the systems can become very large in order to generate sufficient amounts of electricity. Concentrator PV cell systems require fewer PV cells but can only convert direct sunlight to electricity, and therefore require a tracking system and clear skies. Concentrator turbogenerators use concentrated solar energy to heat a medium that is sent through a turbine to generate electricity.

One drawback in the implementation of each of these systems commercially is the expense associated with producing PV cells, tracking systems, and land costs. Moreover, solar power is not economically viable in cloudy regions such as the Northwestern United States or Northern Europe. Though solar power technically is feasible in these regions, the long intervals of low illumination a) drive a requirement for very large energy storage systems to provide power throughout the dark intervals, b) reduce the annual energy output per square meter of solar collection area, and c) do not allow use of concentrator PV cells during the frequent intervals of thin overcast. Thus, in regions of low illumination, solar power is effectively eliminated as a potential clean energy source.

Another market in which solar power is not currently economically feasible is in providing power for military forces, disaster relief, or other mobile applications that require infrastructure. Military forces typically consume large amounts of power, and they often use this power in locations where normal infrastructure either does not exist or is threatened by enemy forces. For example, the Department of Defense (DOD) recently-estimated that the actual cost for a gallon of fuel for the US Army in some parts of Iraq is $700 due to the cost of convoy security for tanker trucks or the cost of helicopter airlift of petroleum to remote locations.

Typical terrestrial power systems, such as dams, coal-fired generators, and terrestrial solar arrays, are immobile. These are unsuitable for use by military forces or emergency response agencies. Mobile terrestrial power systems typically rely on fossil fuels, e.g. diesel generators. Though these often are used by mobile forces, these power systems increase mobile forces' dependence on a steady supply of fuel, which comes at a great expense.

One suggested prior art solution for regions of low illumination is to use very large solar arrays and large energy storage systems. The large arrays produce excess power while the sun shines. This power charges the storage system. When sunlight is not available, the energy storage system is discharged to meet the need for power. Unfortunately, this solution is economically prohibitive as the internal rate of return on the large capital investment is too low for investors. The use of large energy storage adds to the cost of an already expensive system. As a result, this solution is not currently in use.

Another suggested prior art solution is to use solar power satellites (SPSs), also called space-based solar power (SBSP). This approach, proposed by Glaser in 1968 and studied extensively by researchers in the 1970's, uses extremely large satellites in geosynchronous earth orbit (GEO) to collect sunlight and transmit microwave energy to earth. Unlike sunlight, microwaves penetrate clouds, so power from SPSs is available despite cloud cover. But the initial engineering and transport costs are prohibitive. SPSs require transport of many thousands of tons of equipment to GEO for each satellite. Further, there are human safety concerns about irradiation by large side lobes of the microwave beam and environmental concerns about microwave heating of the ionosphere. Some recent studies suggest that SPSs could work in low earth orbit (LEO) where the side lobes would be smaller and less of the ionosphere would be penetrated by the beam. However, because LEO satellites spend more time in shadow and less time above a given receiver location, the duty cycle is much lower than in GEO, thereby reducing the rate of return on capital investments.

Moreover, typical SPS designs proposed using a gigantic 1 kilometer diameter transmitter with a microwave wavelength of about 12 cm—part of the spectral band set aside for industrial users. Assuming a diffraction-limited beam with uniform intensity across the aperture, the beam's half-width to the first null is about 0.15 milliradians. Achieving a beam this narrow requires exceptionally tight control of the transmitter's shape. Nonetheless, given the nearly 40,000 kilometers from GEO to a receiver in Europe or North America, the sidelobes of the beam remain fairly strong dozens of kilometers from the receiver. In addition to the increased amount of real estate, this raises human health concerns.

For the reasons discussed above, most cloudy regions in the world today have no plans to use solar power to meet their energy needs. However, most other energy options fail to meet increasing consumer (or regulatory) demand for environmental stewardship. Nuclear energy remains costly and, in many nations, politically sensitive. Most viable hydroelectric sites are already in use; furthermore, the environmental cost of hydroelectric power is increasingly recognized, resulting in some dams being torn down. Wind energy is economically and politically viable in some areas, but is not sufficiently available in many regions. Fossil fuels like petroleum or coal are becoming more costly and are implicated in global warming; petroleum is also subject to political embargoes or to attacks on oil fields, pipelines, ports, refineries, roads, or tanker ships (cf., the military costs for fuel in Iraq today.)

SUMMARY

The present disclosure provides a system and method for generating solar power at an airborne platform and transmitting that power to a control station located on the ground. The control station then converts that power to a form suitable for distribution.

More particularly, the present disclosure in one embodiment provides an airborne platform for deployment above the surface of the earth. A solar power generation system is supported by or held in spaced relationship to the airborne platform. Power is transmitted from the airborne platform to one or more receiver or ground stations by a microwave transmitting system.

The apparatus generally comprises an airborne platform that includes a solar power generation system in the form of a PV cell array, one or more microwave transmitters electrically connected to the solar power generation system for transmitting power to one or more microwave power receivers on the Earth's surface, a control station and a communication system linking the control station with the airborne platform. A navigation system, including a propulsion system, allows the airborne platform to maintain a position relative to the microwave receivers. The airborne platform may further be tethered to a specific location at the Earth's surface.

The airborne platform supports the solar cell array above the clouds and other atmospheric attenuation. The PV cell array may include individual steering elements or steerable solar energy collection panels that track the sun throughout the day. These steering elements may be at least partially independent of the steering of the airborne platform to minimize the effect of wind currents on the ability to maintain direct sunlight on the PV array. As a result, the solar cells have a high duty cycle, i.e., they are exposed to direct sunlight roughly 12 hours per day, depending on the latitude and time of year, and they receive brighter sunlight than PV cells at ground level which may operate under clouds, haze, pollution, and other diffusing elements.

The system of the present disclosure locates a solar power generation system above the clouds and other attenuating elements. Therefore, the system of the present disclosure uses a smaller (and less expensive) set of solar arrays and much less energy storage than systems employing PV cells at ground level. Because it avoids the diffusing effect of clouds and maintains direct sunlight, it allows use of concentrators or concentrating cells. Furthermore, because the airborne platform is at a much lower altitude than SPS systems, the system of the present disclosure delivers power with much weaker sidelobe radiation than SPS, greatly reducing human exposure to microwaves.

The land area used by the microwave receiver can be substantially smaller than the area required for terrestrial solar arrays with similar average power output. This reduces initial cost to acquire land, which can be a significant fraction of the cost for terrestrial solar power. It also reduces environmental impact of lost foliage.

The airborne power station of the present disclosure is deployed at an altitude that corresponds to a cooler ambient temperature than ground locations. Because PV cells are more efficient at lower temperature, the solar cells of the present disclosure are more efficient than terrestrial solar power systems. The solar power generation system may be suspended from the airborne platform with cables or the like, placed on the surface of the airborne platform, or located within the airborne platform.

In particular embodiments, the present disclosure provides for orienting the solar power generation system to maximize the incident angle of sunlight. This may be accomplished by steering the airborne platform or by manipulating the azimuth and elevation angles of the solar power generation system or by some combination of methods.

Another aspect of the present disclosure provides a method for generating solar power from an airborne power station, comprising the steps of providing an airship filled with a buoyant gas, the airship including a solar power generation system and a microwave transmission system; releasing the airship from its mooring; controlling the flight of the airship to reach a desired location; orienting the solar power generation system to maximize power output; aiming the microwave power transmission system at a microwave power receiver; and transmitting that power to the microwave power receiver.

Other systems, methods, features, and advantages of the present disclosure will be or become apparent upon examination of the following drawings and detailed description. The features, functions and advantages that have been discussed can be achieved independently in various embodiments of the present disclosure or may be combined in yet other embodiments further details of which can be seen with reference to the following description and drawings.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, wherein:

FIGS. 7A and 7B are illustrations of a combined solar power generation system and microwave transmission system according to an alternative embodiment of the present disclosure;

FIGS. 9A and 9B are side and rear illustrations, respectively, of an airborne solar power station in accordance with another alternative embodiment of the present disclosure;

FIGS. 10A and 10B are rear illustrations demonstrating the operability of the airborne power station shown in FIGS. 9A and 9B;

FIGS. 12A and 12B are side and rear illustrations, respectively, of an airborne power station in accordance with an alternative embodiment of the present disclosure;

FIG. 13 is a rear illustration demonstrating the operability of the airborne power station shown in FIGS. 12A and 12B;

FIG. 16 is a side illustration of an airborne power station in accordance with an alternative embodiment of the present disclosure;

DETAILED DESCRIPTION

Figure 1:
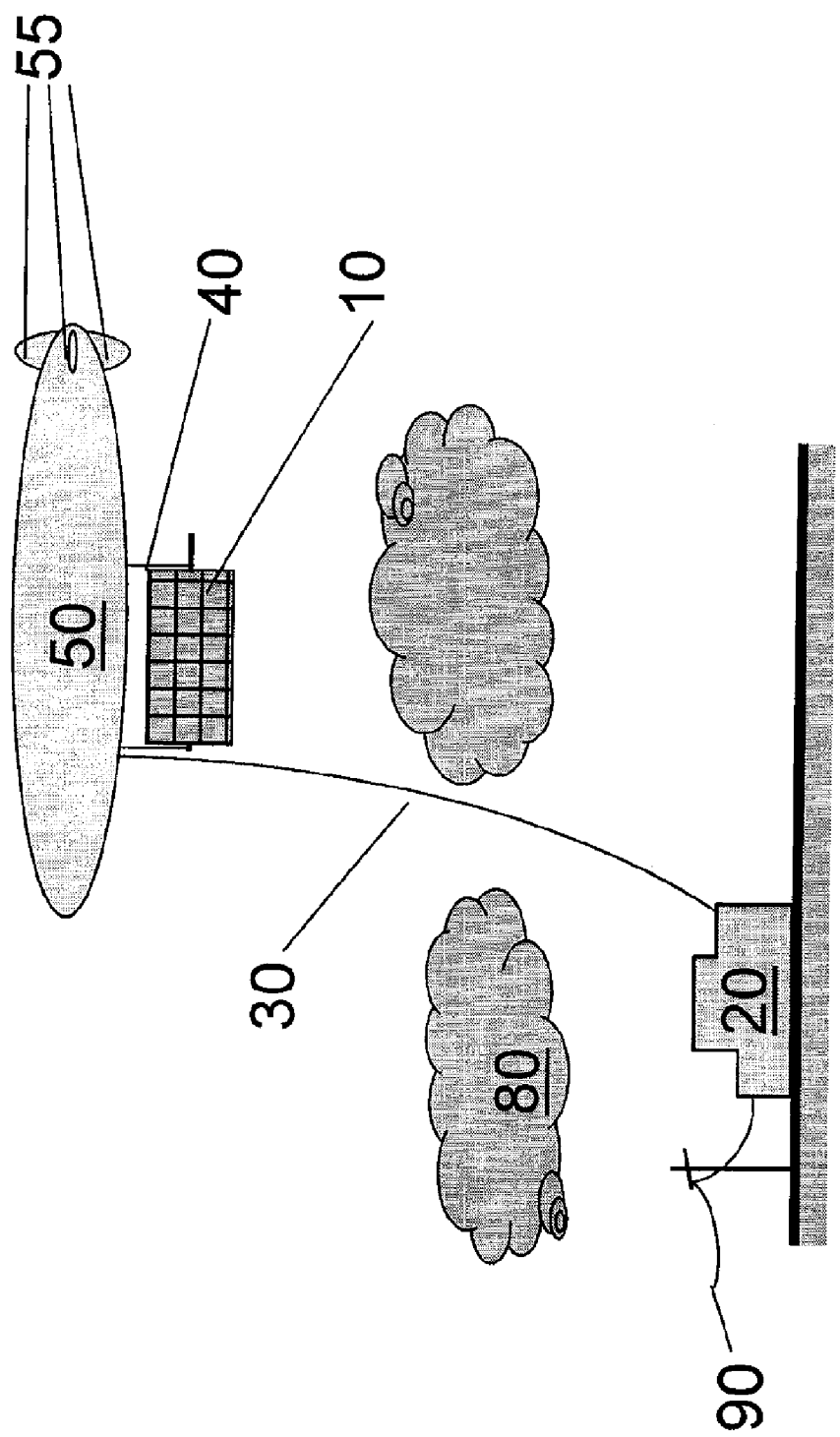
FIG. 1 is an illustration of an airborne solar power station in accordance with an exemplary embodiment of my parent U.S. application Ser. No. 12/049,234.

Referring to FIG. 1, in my aforesaid parent application I describe an airborne power station comprising an airborne platform 50 having a solar power generation system 10 and an electric cable 30 to transport power to the a control station 20 on the ground. The airborne platform supports the solar power generation system above the clouds 80 and other atmospheric attenuation. The control station receives the power generated at the airborne power station and distributes the power to, for example, local infrastructure 90.

The airborne platform may be an airship, including a blimp, a semi-rigid airship, or a rigid airship. As shown in FIG. 1, the airship 50 may have aerodynamic stabilizers 55 at the tail. The airborne platform preferably will include controls for the platform's yaw (steering), pitch, and/or roll. Airship embodiments may further include aerodynamic surfaces designed to produce lift when the wind blows.

The solar power generation system may be one or more photovoltaic (PV) cell arrays, optical rectennas, and/or electric generators driven by a solar-heated thermodynamic engine. FIG. 1 shows a PV cell array 10, which may be a flat panel cell PV array or a concentrator cell array, which is positioned below the airship by structural elements 40. Preferably structural elements 40 are sufficiently rigid so as to permit pointing of the solar arrays independent of the airborne platform. In alternative embodiments, particularly for use at high latitudes, the solar power generation system is suspended below the airship at a distance, e.g., by cables, where it is rarely or never shaded by the airship. In yet other alternative embodiments, the solar power generation system includes elements that can be steered, e.g. to point more directly toward the sun, in order to maximize the amount of direct sunlight, and consequently, the output of electrical energy. The solar power generation system also includes power conversion equipment that converts power from the form produced by the power generation system to a form better suited for transmission along the power cable. For example, it may convert the low-voltage DC output of a photovoltaic array to high-voltage three-phase power.

The power cables could also function as tethers. Alternatively, one or more tethers are provided. The system may further include one or more mooring devices to which the power lines/tethers are attached.

The use of power cables to transmit power, limits the maximum deployment altitude due to the airship's limited ability to carry weight. Longer cables weigh more, so high altitude operation requires either a cable so heavy that it exceeds the airship's carrying capacity or a cable so thin that its electrical resistance consumes most of the power produced by the solar array. Thus, the practicable altitude limit of an airborne platform with power cables is approximately 15,000 ft, and is probably not feasible much above about 10,000 feet, which may not be above high altitude clouds.

Further, the use of power cables requires that the airship must be grounded during high winds. In regions with frequent high winds, this reduces availability, increases operating costs, and increases the risk that the airship will be damaged during handling on the ground.

The power cable(s) also pose an obstacle to air traffic. Therefore, the system could only be used in locations where an air exclusion zone is feasible. For example, today's US Army excludes air traffic below 15,000 feet for a two-mile radius around the tether station of its JLENS tethered airship, which is used as an airborne radar platform.

Where power cables are used for transmission, power from the airship can reach the ground in only one place during any short interval of time. Thus, applications such as disaster relief or military operations where multiple ground sites need power, but transmission cables between sites are non-existent or disrupted, are also limited.

Figure 2B:
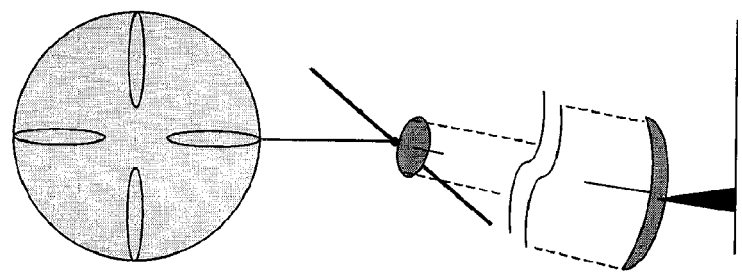
FIGS. 2A and 2B are side and rear illustrations, respectively, of an airborne solar 12 power station in accordance with a first exemplary embodiment of the present disclosure.
Figure 2A:
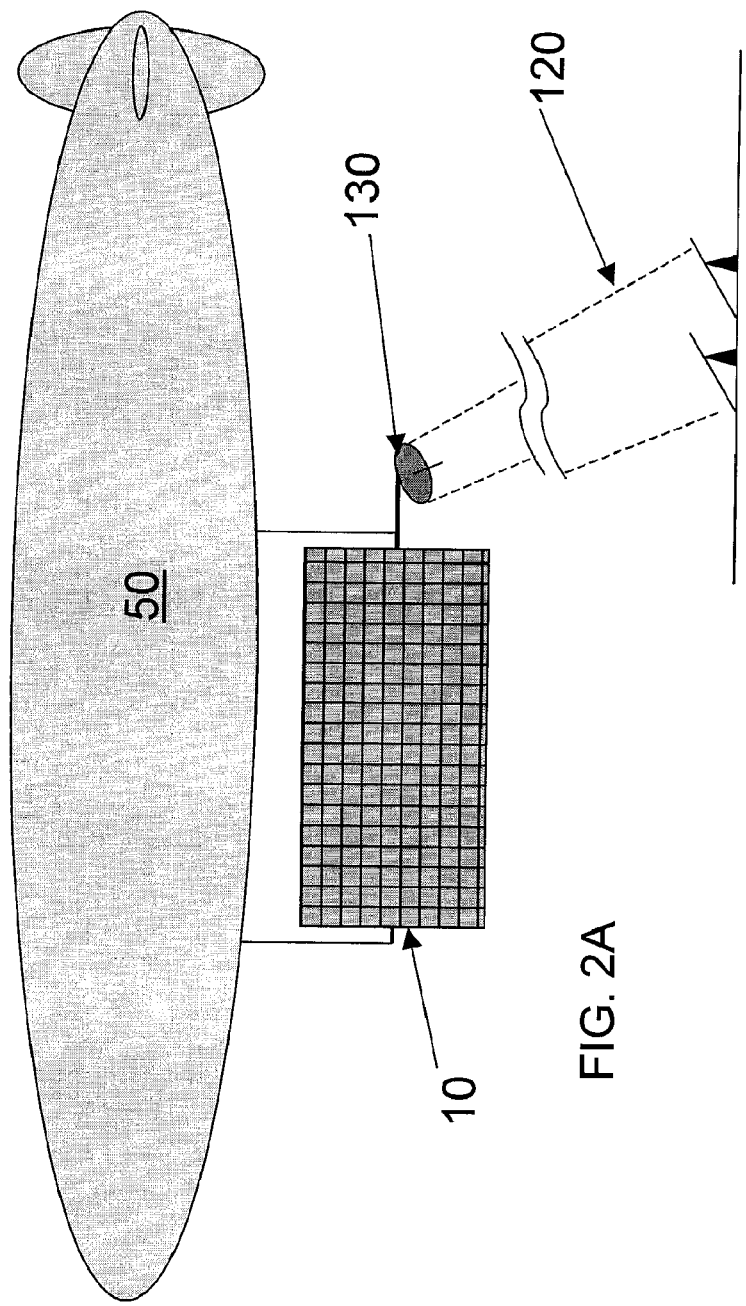

Referring to FIG. 2, the present disclosure provides a microwave power transmission system 130 electrically connected to solar power generation system 10, i.e. a solar cell array for transmitting power to a microwave receiver or ground station 120 on the ground. Employing a microwave power transmission system enables operation at sufficiently higher altitudes, e.g. up to 60,000 feet or higher. This allows the system to operate above nearly all storms, above nearly all optical attenuators or diffusers such as cirrus clouds, above airline traffic, above small arms fire and beyond the reach of anti-aircraft systems. Using microwave transmission also permits the airborne platform to operate untethered.

The airborne platform using a microwave transmission system is tolerant to high winds. Indeed, a properly designed implementation can operate in the so-called "wind notch" at about 60,000 feet. In the wind notch, winds are much slower than at higher or lower altitudes. The ability to operate at this altitude dramatically reduces propulsive power needed to hold position.

The untethered airborne platform also provides a minimal hazard to air traffic. Because the present disclosure does not require a cable between the airship and the ground, there is no collision hazard for aircraft flying below the airship's altitude. Moreover, microwave exposure is not a serious risk, as typical aircraft skins reflect microwaves. Thus, exposure to passengers, crew, and avionics is minimal if an aircraft happens to fly through the beam, though this would probably be avoidable.

Unlike a power cable which delivers power to a single point, the microwave transmitter(s) can be directed at various receivers within a region as large as a major metropolitan area. This allows a single airborne power station to serve multiple sites on the ground, even sites not connected by power lines.

Because in most of the embodiments of the present disclosure a) the system does not require a physical attachment from airship to ground and b) the airship is self-propelled, the airship can quickly and easily be relocated to areas where demand for energy is stronger and/or prices are higher—even if the new area is distant. This improves on the mobility offered by the cable-attached airborne power system which must be towed to a new location (or deflated, shipped, and reinflated). This improved mobility can improve the return on investment compared to a system that is less mobile.

The microwave transmitter 130 converts electric power from the solar power generation system to a beam of microwaves. Microwave Transmitter 130 may include solid state amplifiers or vacuum-tube amplifiers such as klystrons, amplitrons, and gyrotrons, and may be capable of shaping and direct the beam via a mechanically steered antenna or via an electronically steerable array (often called a phased array antenna). The latter may include circuits to automatically measure mechanical distortion of the array and adjust the phase of each transmitting element to compensate for that distortion. Some embodiments use an electronically steerable array whose transmitting elements are attached to various points on the back side of a photovoltaic array (i.e. the solar power generation system), thereby minimizing cable runs and avoiding a separate structure to support the microwave transmitter (this has been proposed for spacecraft PV arrays in prior publications). This joined PV/microwave array may be embodied as a flat array that is suspended below the airborne platform as in FIG. 2 or other embodiments discussed below.

Figure 3B:
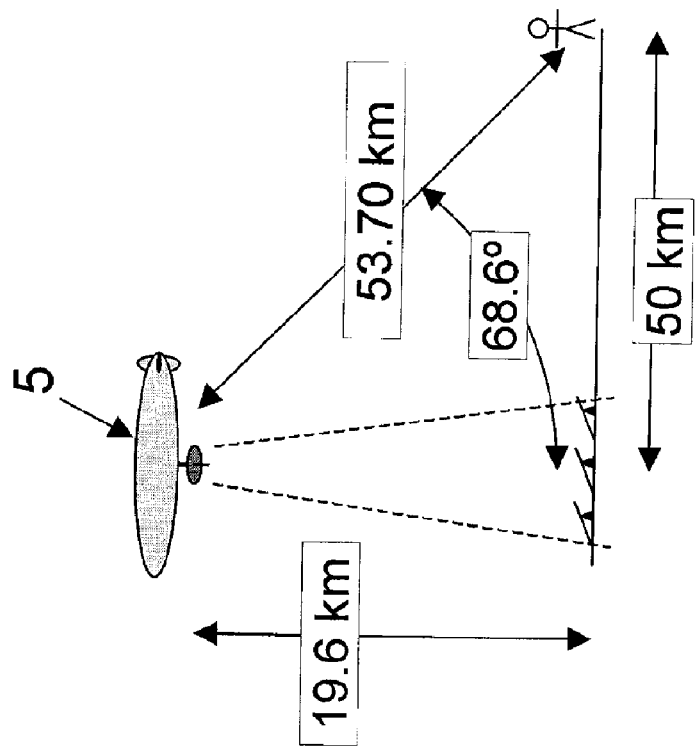
FIGS. 3A and 3B are rear illustrations comparing, respectively, a solar power satellite system of the prior art with the airborne power station of FIGS. 2A and 2B.
Figure 3A:
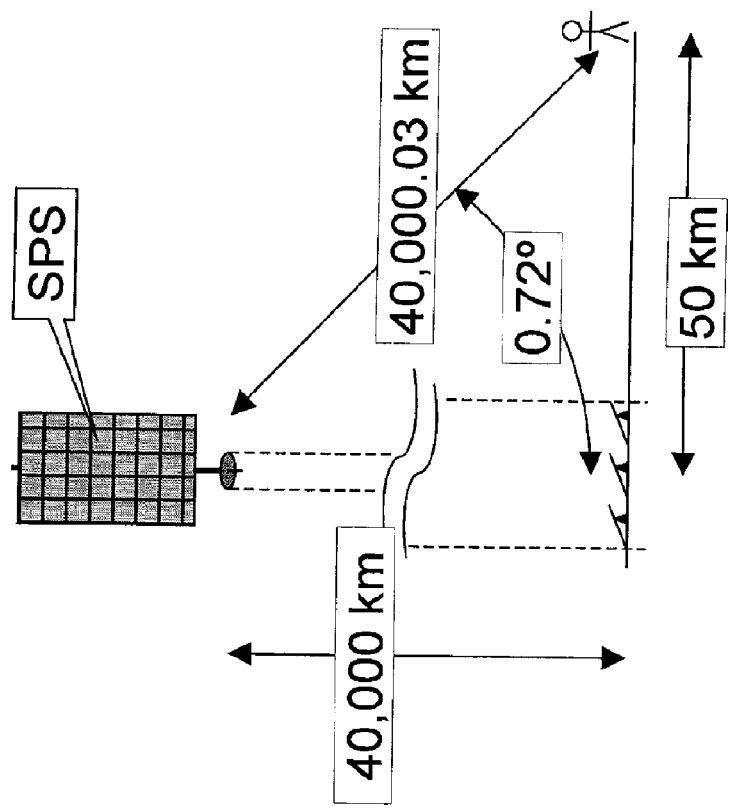

As noted above, compared to SPSs, the system of the present disclosure has greater attenuation for beam sidelobes, greatly reducing issues of human safety and radio interference. Because the system of the present disclosure operates at a much lower altitude than SPSs, any point on the ground at some distance from the microwave receiver has a larger off-axis angle and a longer slant range relative to the main beam. FIGS. 3A and 3B depict a bystander positioned 50 km from a microwave receiver. With SPSs (FIG. 3A), the off-axis angle is only 0.72 degrees and the relative range (slant range/main beam range) is 1.00000075. With the airborne platform 50 of the present disclosure on the other hand (FIG. 3B) at 60,000 feet altitude, the off-axis angle is over 68 degrees and the relative range is 2.74.

In contrast with SPS technology, the system of the present disclosure has a much smaller beam footprint. A transmitter aperture of 20 meters diameter—well within the state of the art—gives a beam half-width of 7.4 milliradians, or nearly half a degree. This is technologically easy to achieve. Even with the relatively wide beam angle, the deployment altitude of the system of the present disclosure of no more than about 20 km gives little distance for the beam to spread. In addition, because the transmitter is only a few kilometers from the receiver, the $1/R^2$ law causes a significant drop in intensity at distances more than a few kilometers from the receiver. As a result of these two factors (short distance for beam to spread and significant $1/R^2$ drop beyond the receiver), the sidelobe intensity a few kilometers from the receiver is orders of magnitude weaker than for SPSs, thereby substantially reducing potential health concerns.

Figure 4:
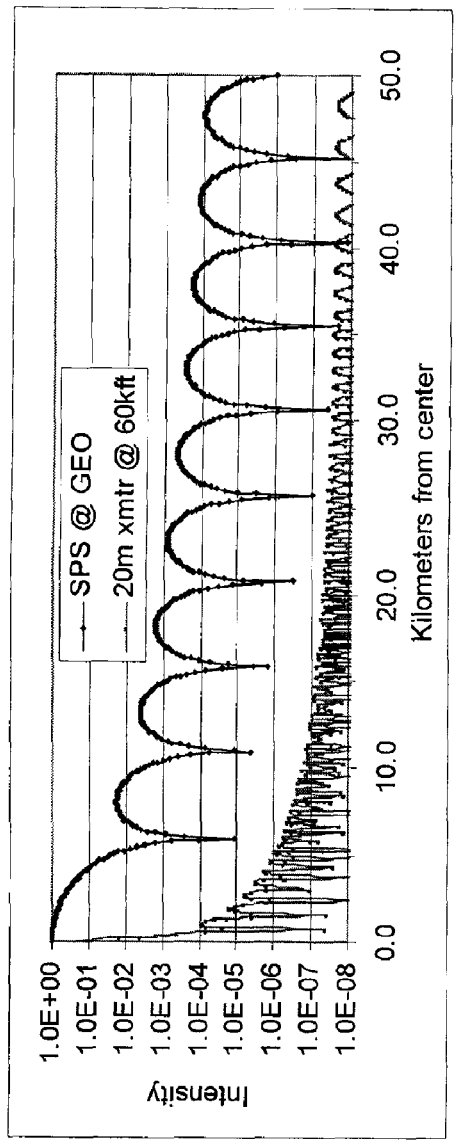
FIGS. 4 and 5 are plots of beam footprints in accordance with the present disclosure.

FIG. 4 plots simulated beam footprints for an SPS and the system of the present disclosure. Both methods assume a 12 cm wavelength. The SPS plot assumes a 1 km transmit aperture at GEO. The first null is 6 km from the center of the beam. At 50 km from the center of the receiver, microwave intensity has fallen by only four orders of magnitude relative to its peak intensity. By contrast, the plot for the system of the present disclosure assumes a 20 meter transmit aperture in the wind notch at 60,000 feet altitude. At 50 km from the center of the receiver, the microwave intensity has fallen seven and a half orders of magnitude relative to its peak—three and a half orders of magnitude better than that of the SPS beam.

Figure 5:
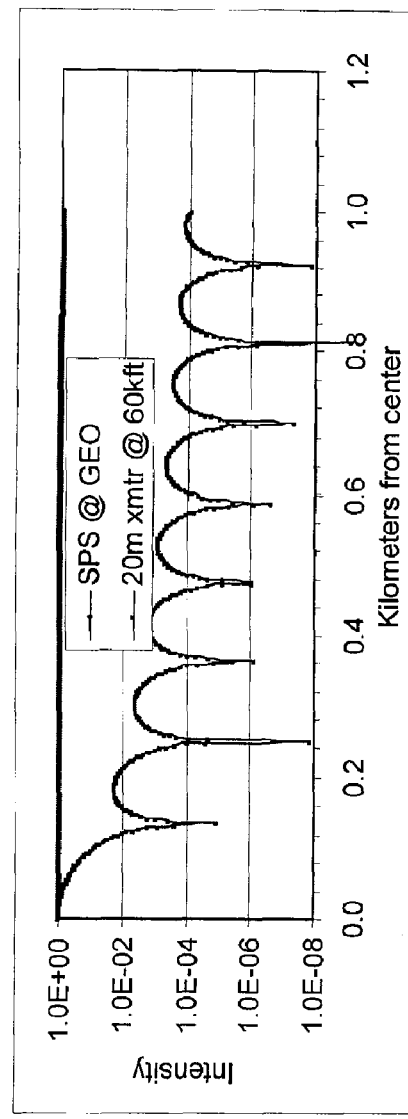

FIG. 5 provides a more detailed plot at both beam footprints near the center of each beam. The first null of the beam of the system of the present disclosure is at 136 meters from the center of the receiver. This means the receiver array can be as small as 250 meters diameter, yet receive about 80% of the beam power. (The power contained inside the first null of a circular diffraction-limited beam is 83.8% of the total power.) This allows the receiver to be built to a reasonable scale and cost. For the SPS, the first null is at 6 km; the receiver array must therefore be many kilometers in size to capture most of the beam's power. This requires a much greater scale and costs. This adds significant costs and program risks. Thus, the system of the present disclosure avoids these significant costs and risks of SPS systems.

The microwave receiver 120 collects the microwave beam and converts it to electrical or thermal power. The microwave receiver 120 typically includes a circuit to a) measure the position and quality of the arriving beam and b) signal the microwave power transmission system 130 to adjust the beam if needed. It further includes a beacon transmitter that provides a phase reference for the microwave power transmission system. The microwave receiver will also typically include a rectenna to convert microwave power to DC electricity, though alternate embodiments may include a dipole array (which produces AC electricity with the same frequency as the microwave beam) or a concentrating dish or trough with a thermal collector at the focus. In some embodiments, the microwave power receiver is mechanically or electronically steerable to track the airship as it moves across the sky. In other embodiments, the orientation of the microwave power receiver is fixed to collect power from an airship that loiters at a particular point in the sky, as in prior art receiver designs for SPSs. The microwave power receiver may include elements that can be easily folded or disassembled for transport (e.g. on a ship, truck or train) and easily deployed when it reaches a point of use.

The present disclosure also provides a control station including a monitor and control system to automatically monitor and control or to permit a human operator to monitor and control the system, for example, to adjust the airship's steering fins or to open a circuit breaker in the power generation system. The system may also include a communication system to transfer data between the control station and the airborne platform. The communication system transfers data between the airship and the control station. The data may include, for example, diagnostics to measure the health of the PV array and information for pointing the microwave transmission system, such as a beacon. The data may be used to optimize the performance of the airborne power station, control the propulsion or avionics of the airship, or to perform self-diagnosis.

Figure 6:
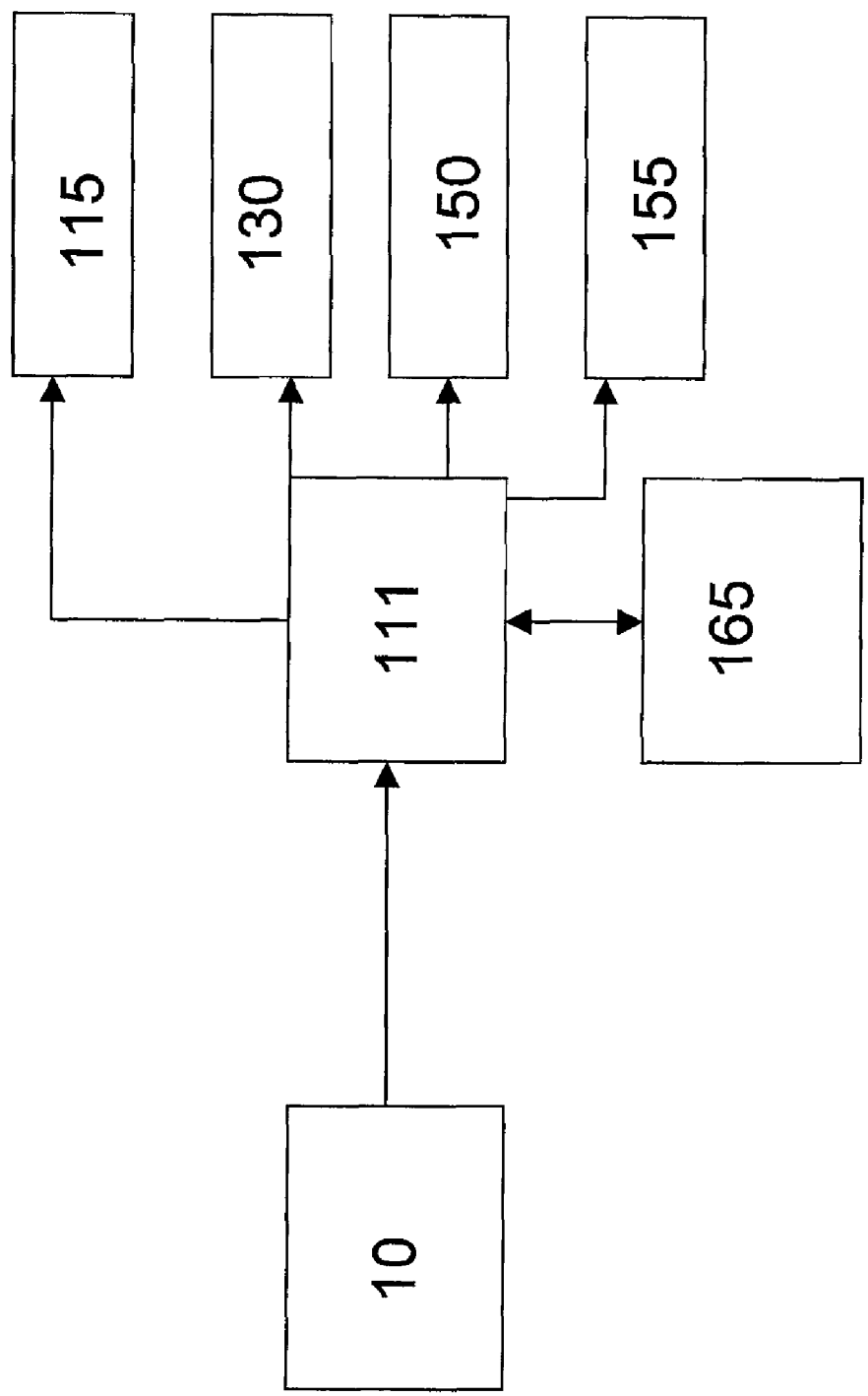
FIG. 6 is a schematic showing a method of operating the airborne power station of the present disclosure.

Various embodiments of the present disclosure include other unique features. For example, the airship may include a propulsion system that enables the airship to maintain position against the wind. Referring to FIG. 6, a fraction of the power produced by the photovoltaic array 10 distributed by a power management and distribution system 111 may be used to operate the propulsion system 150. Additional power may be provided to the controls and actuators 115 and avionics 155 for airship control while the bulk of the power produced may be distributed to the microwave transmitter 130. The power management and distribution system typically will utilize an energy storage element 165 to store converted solar energy during the day and provide propulsive energy during the night.

In one exemplary embodiment, shown in FIGS. 7A and 7B, the microwave transmitter is implemented as a phased array of microwave transmit modules 132 that are attached to the back of the solar cell array 10, which is also made up of individual array segments 12. FIG. 7A shows the PV array segment connected to the microwave transmit module by short power wires 13. This eliminates the weight, cost, and resistance loss of systems to aggregate electric current from the solar cells and transport that current to the microwave transmitter. It also typically reduces the peak voltage of the electrical system and thereby reduces high-altitude arcing issues.

Figure 8:
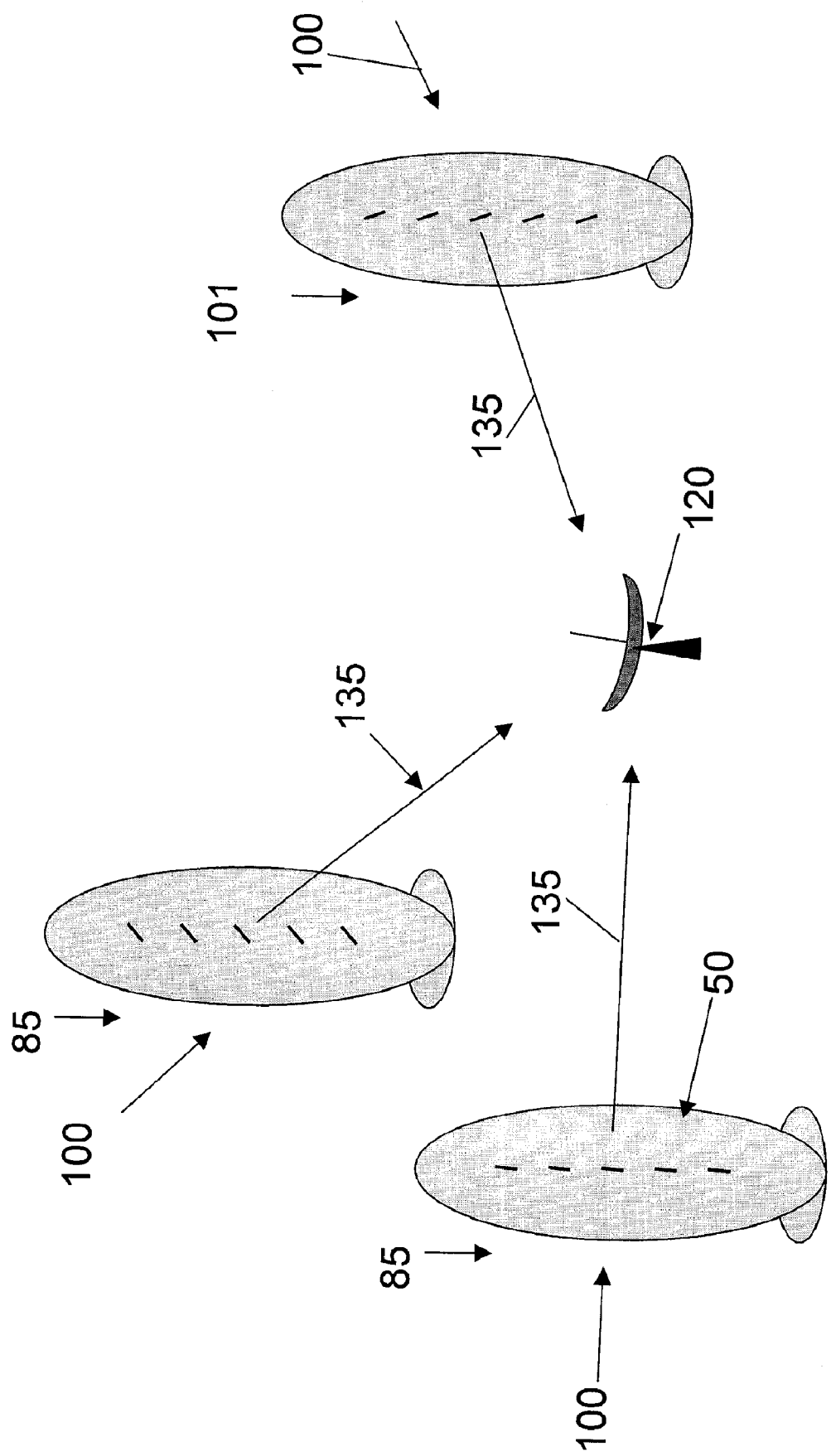
FIG. 8 is an illustration of an airborne power station according to another alternative embodiment of the present disclosure.

Modules like this may receive sunlight 100 on one side and transmit microwaves 135 from the other side. The transmitted microwave beam from the whole array is formed and steered by controlling the phase of each module individually. The beam can be steered over a limited range of angles, typically less than 60 degrees from the normal axis. Therefore, associated with this integrated solar/microwave array is a unique operating method, shown in FIG. 8. The method compensates for the limited field-of-regard of the microwave transmitter relative to the location of the sun. The method includes moving the airborne platform while maintaining the airborne platform headed into the wind 85 to allow efficient transmission to a fixed ground site as the sun crosses the sky.

In another exemplary embodiment, a unique operating method (applicable to all self-propelled embodiments) compensates for attenuation of microwaves by occasional heavy rain, such as the rain in thunderstorms. The method includes moving the airborne platform to minimize the amount of rain between the transmitter and the receiver.

In another embodiment of the present disclosure, the microwave power receiver is attached to a mobile platform on the Earth's surface. A mobile embodiment is particularly useful for military operations or for emergency response. Unique operating methods associated with this disclosure include moving the platform to reduce rain losses and swiveling the platform to help the microwave receiver efficiently receive the microwaves from the airborne platform.

The present disclosure also includes several embodiments for arranging the solar power generation system and associated PV arrays. FIGS. 9A and 9B show an alternative embodiment in which a PV cell array 110 is mounted on the surface of an airship 50. The airship and its attitude control mechanism are configured so that the airship can maintain a selected roll angle and thereby keep the PV cell array oriented toward the sun as the sun moves from low to high elevation above the horizon (represented by arrows 52 and 54, respectively, in FIGS. 10A and 10B). This embodiment is well suited for use of PV cell arrays composed of concentrating cells such as linear concentrator elements such as a trough concentrator or a stretched lens array. The airship 150 may also be able to maintain selected yaw or pitch angles to maximize the amount of direct sunlight on the PV cell array, subject to structural limitations.

Figure 11:
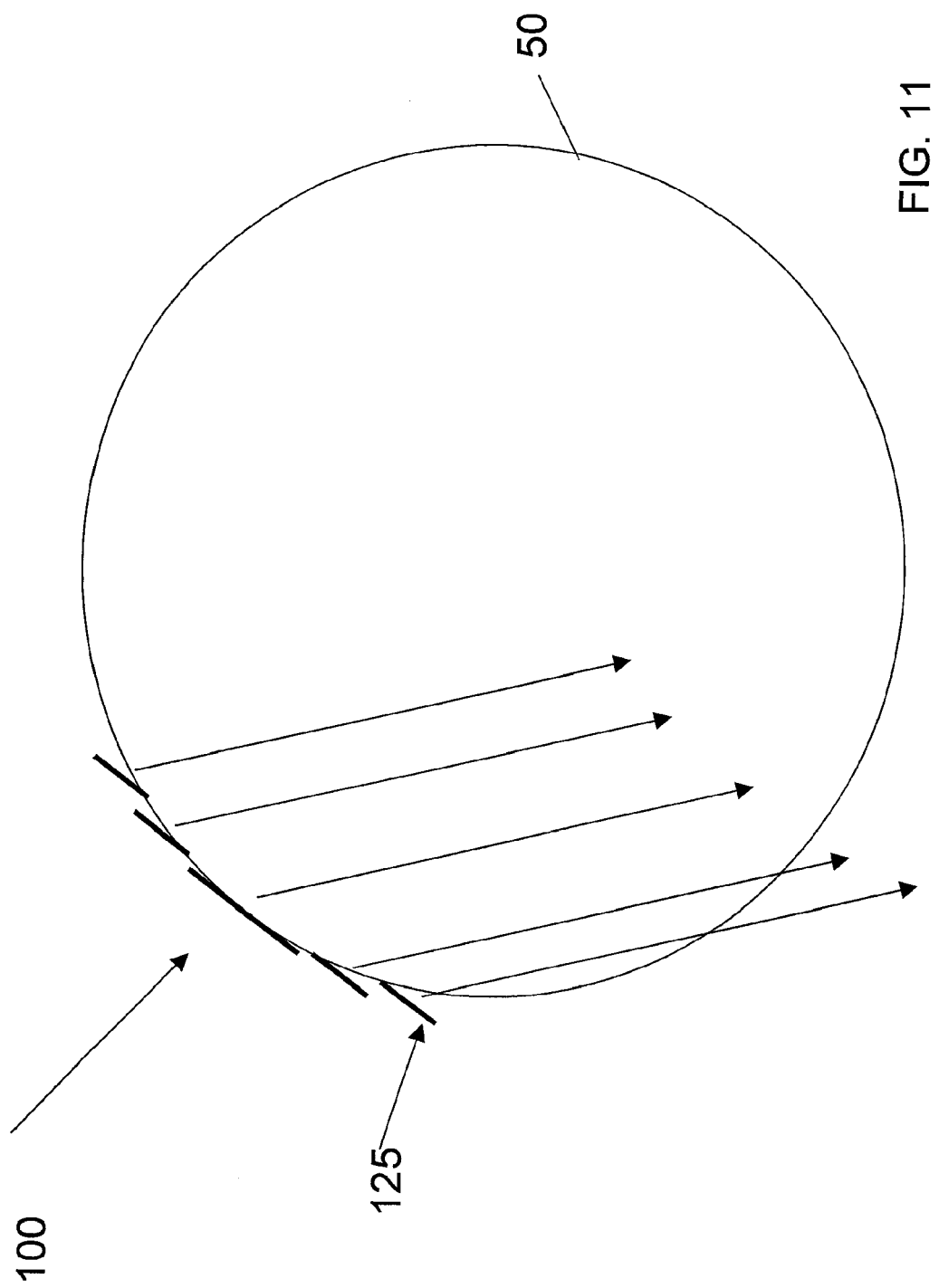
FIG. 11 is a rear illustration of an airborne power station according to another alternative embodiment.

In a further embodiment, however, the system uses a joined PV/microwave array 125 (as described above in connection with in FIGS. 7A and 7B) mounted on the top or sides of an airship whose envelope and associated structure are transparent to microwaves. See. FIG. 11. The microwave beam passes through the airship 50 on its way to the microwave power receiver.

Another alternative embodiment, shown in FIGS. 12A and 12B, provides the solar power generation system as a PV cell array 210 that tilts to increase the incident angle of sunlight 100 on the array as the sun moves across the sky. According to FIG. 13, the array's range of tilt angles 201 may be large enough that the array can flip to directly face the sun on either the right or left side of the airship. This configuration may be particularly useful if the direction that the airship 250 faces depends in part upon the time of year (e.g. winter sun 100A verses summer sun 100B) and/or direction of the wind.

Figure 14B:
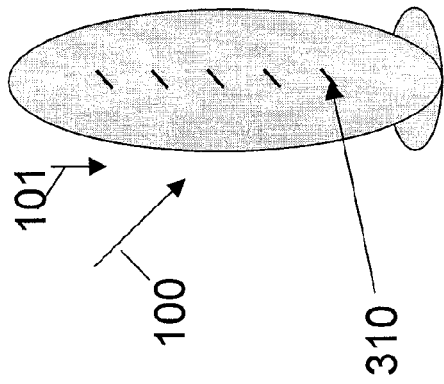
FIGS. 14A, 14B, and 14C are side, top, and top illustrations, respectively, of an airborne power station in accordance with an alternative embodiment of the present disclosure.
Figure 14A:
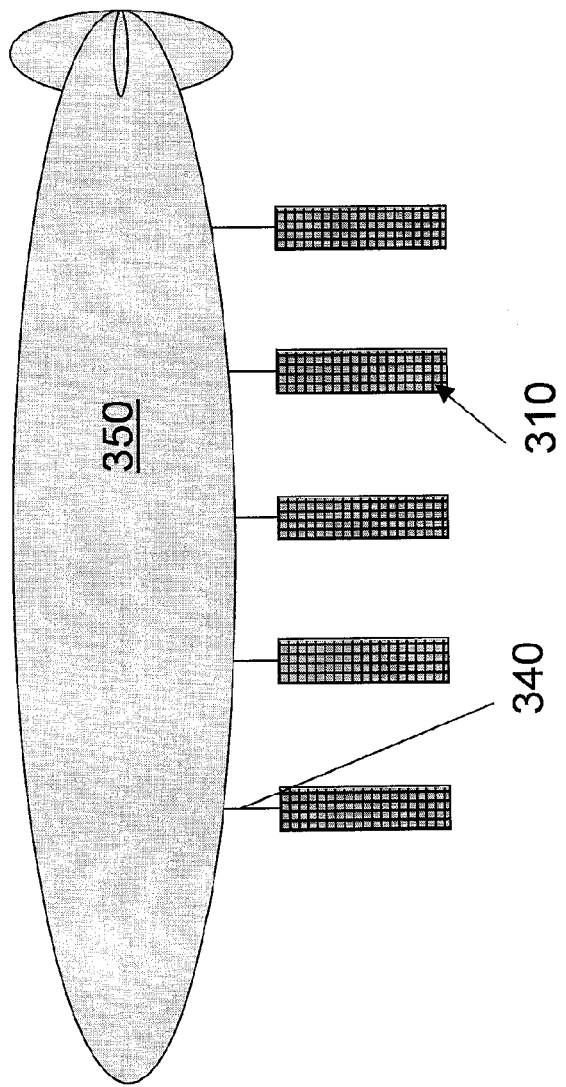
Figure 14C:
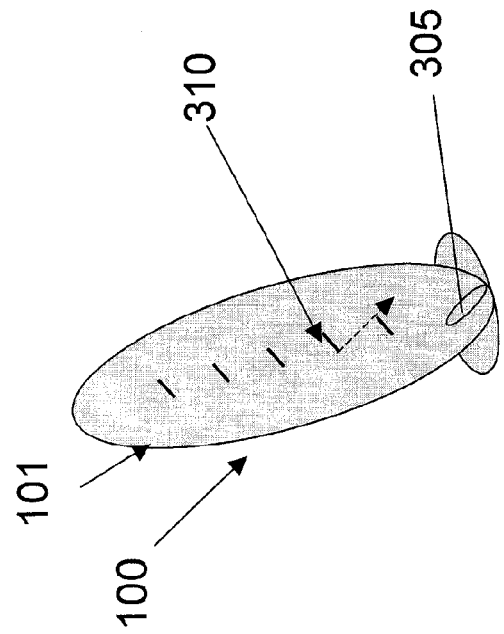

FIGS. 14A, 14B, and 14C show another alternative embodiment in which a number of steerable solar energy collection panels comprising, e.g., thin, vertical PV cell arrays 310 are suspended below an airship 350, by structural elements 340. Each array can be steered, e.g., swivel in azimuth to track the sun 100. The arrays may face forward, aft, or to either side, even when the airship is compelled by wind 101 to face almost directly into the sun or away from it (see FIG. 14B). When the direction toward the sun is directly upwind or downwind, the airship's steering system may be configured to "crab" slightly so that the arrays do not substantially shade each other, as shown in FIG. 14C. Crabbing may be accomplished, for example, by manipulating the aerodynamic stabilizers 355 at the tail. However, this diagonal orientation increases drag, and in turn increases the tension on the tether. Crabbing may therefore be restricted to lower wind speeds.

Figure 15B:
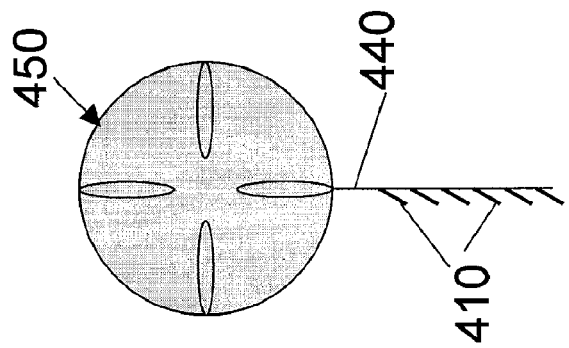
FIGS. 15A and 15B are side and rear illustrations, respectively, of an airborne power station in accordance with an alternative embodiment of the present disclosure.
Figure 15A:
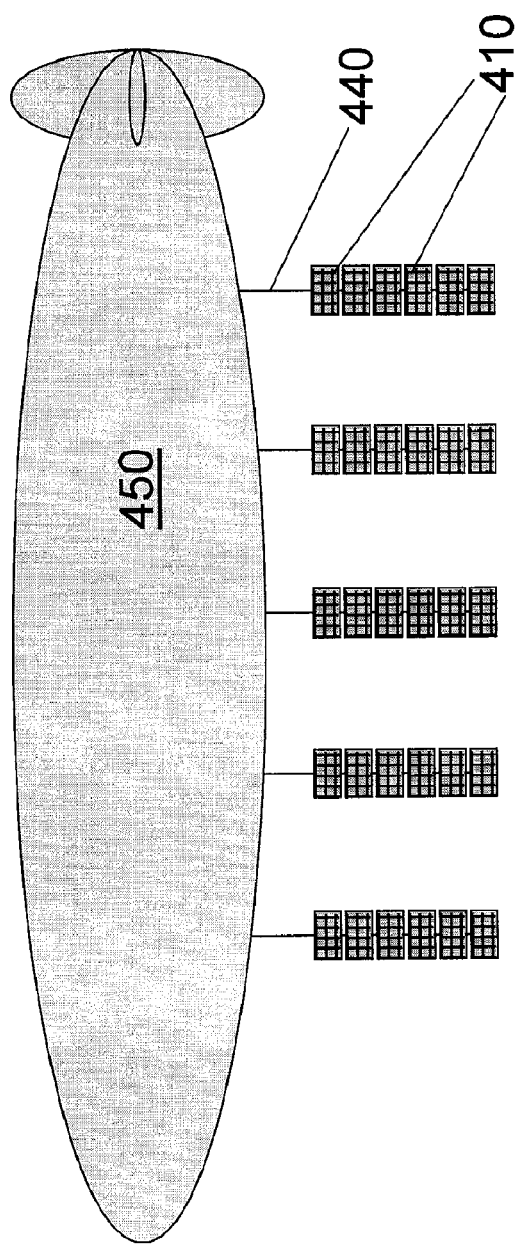

Another alternative embodiment, shown in FIGS. 15A and 15B, uses PV cell arrays 410 that swivel in azimuth and in elevation to further increase the average incident angle of sunlight on the array. In the figures, the arrays are held beneath the airship 450 by structural elements 440.

In another alternative embodiment, a support structure 515 functions as a stabilizing element to restrain the hanging PV cell arrays 510 to limit their relative movement in the wind. See FIG. 16. In tethered embodiments, the anti-sway support structure 515 may be attached to the tether 535 which provides horizontal tension to resist wind-induced drag forces on the PV cell arrays. A reel mechanism 540 may be provided to automatically vary the length of the anchor segment which attaches the anti-sway structure to the tether. This will maintain position of the PV cell arrays despite changes in the position of the tether, e.g. due to variations in wind speed.

Figure 17:
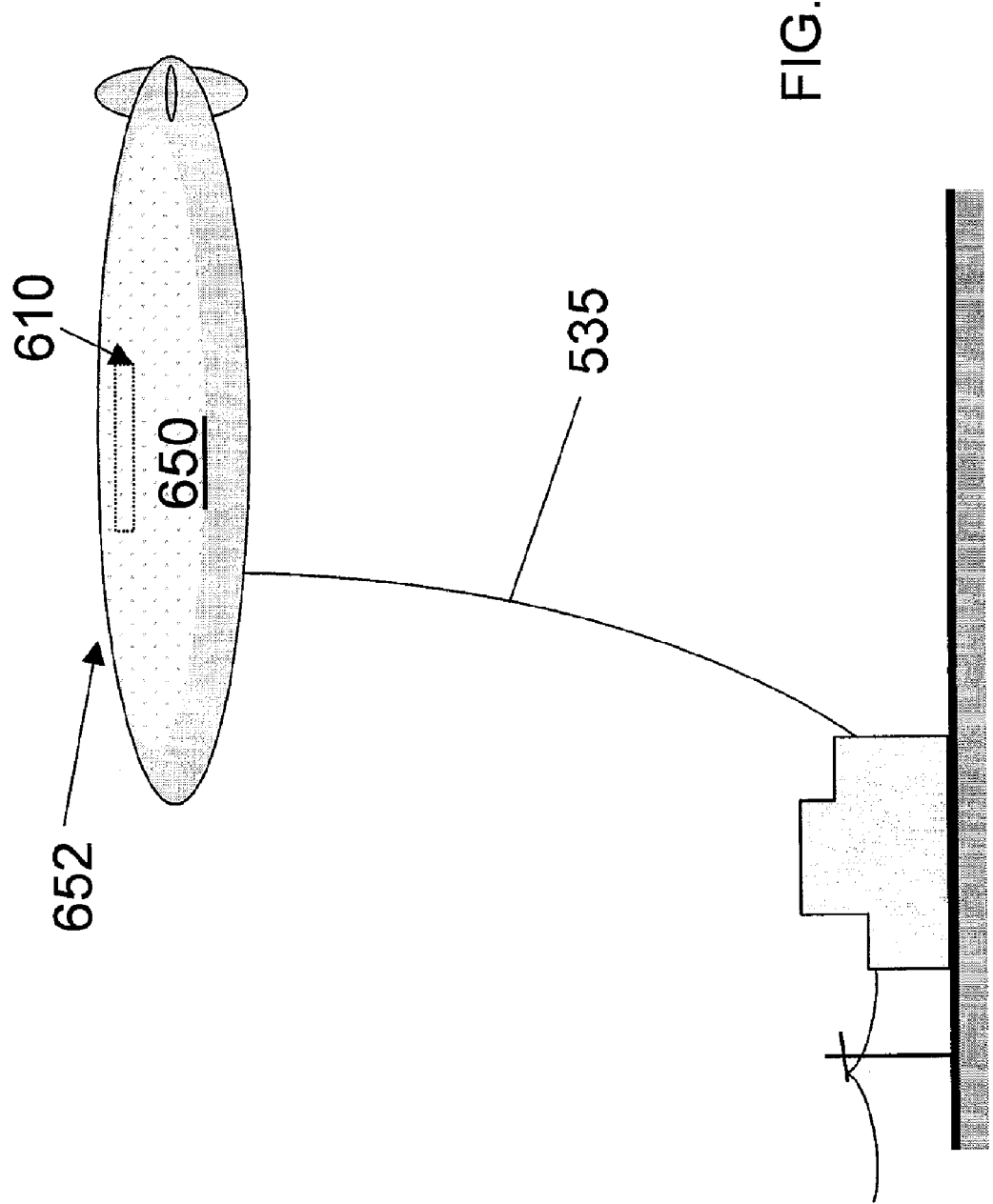
FIG. 17 is an illustration of an airborne power station in accordance with an alternative embodiment of the present disclosure.

FIG. 17 illustrates another alternative embodiment in which the airborne platform is an airship 650 with a transparent upper surface 652. This allows the PV cell array 610 to be located inside the airship where it is protected from weather and cooled by the buoyant gas. This embodiment may further incorporate the ability to rotate to a selected roll angle as in FIGS. 10A and 10B.

Figures 18A, 18B:
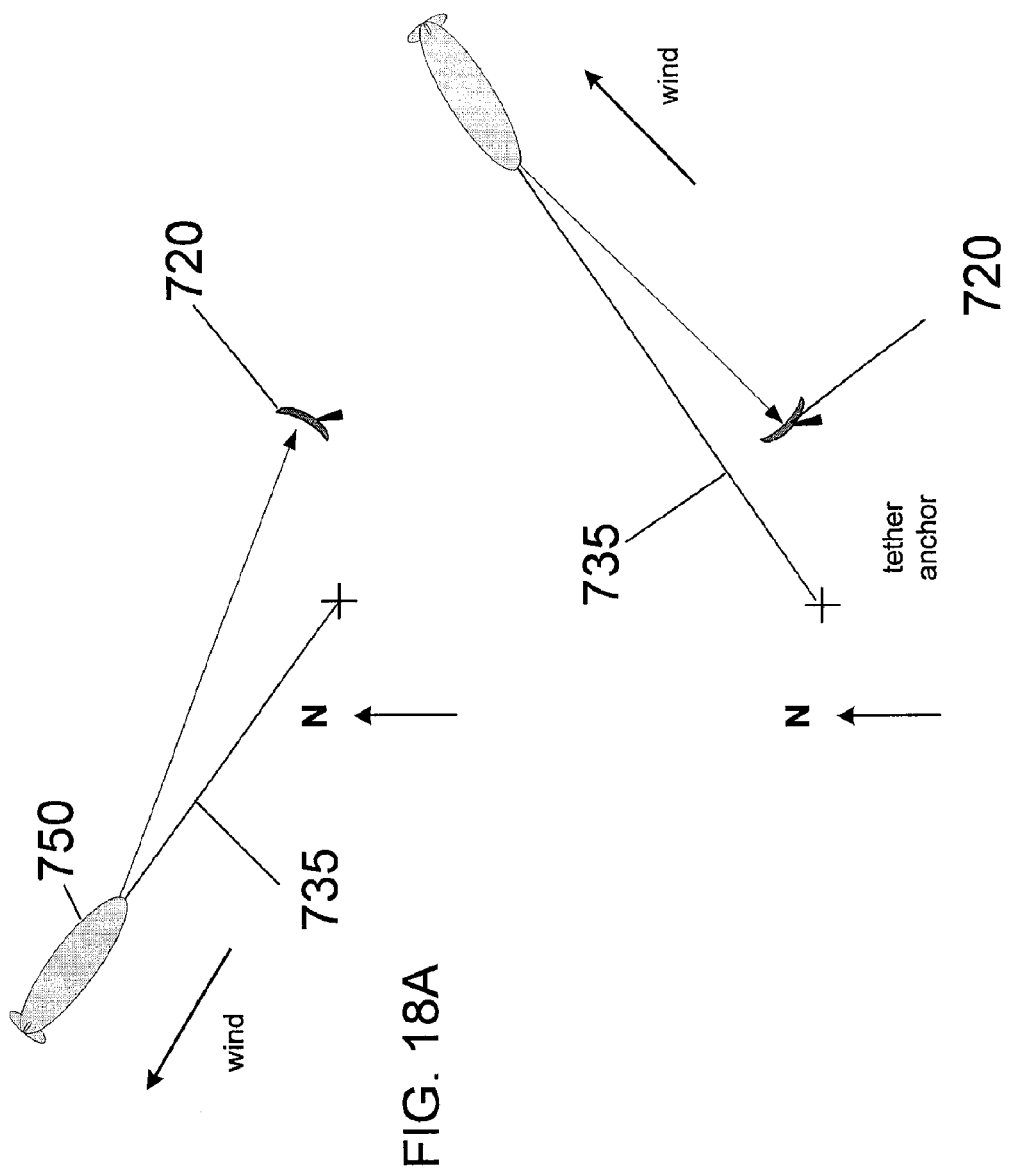
FIGS. 18A and 18B are illustrations of an airborne power station in accordance with an alternative embodiment of the present disclosure.

In another embodiment, shown in FIGS. 18A and 18B, the airship 750 is tethered, but has no power cable to the ground. The tether 735 is purely functional to hold the airship in position against the wind. A microwave transmitter sends power from the airship to the ground. A microwave receiver 720 on the ground swivels (mechanically or electronically) to face the airship as the wind direction changes. FIGS. 18A and 18B illustrate this embodiment on a day when the wind initially blows from the southeast but later blows from the southwest. In both cases, the airborne platform faces toward the tether anchor point and transmits microwave power in roughly the same direction.

Because this embodiment has no power cable, it allows use of a lighter tether and therefore allows the airship to operate at altitudes greater than 10,000-15,000 ft, though not as high as a free-flying airship (approximately 60,000 ft). As can be seen in FIGS. 18A and 18B, the transmitter always points toward the nose of the airship, and therefore this embodiment can use a microwave transmitter with a small field of regard, which is cheaper and lighter than a transmitter with a wide field of regard. Unlike embodiments described above, this embodiment avoids the need for propulsion on the airship. Lack of propulsion can reduce overall cost and weight and also reduce wasted power. Though not suitable for all applications, this embodiment provides a low-cost solution for moderate-altitude applications where propulsion is not vital.

In an alternative embodiment, the airship is tethered as above but also includes a small propulsion system and a reel or other device to retract and extend the tether. This propulsion system is sized to move the airship out of the way of a predicted storm, to relocate the airship in calm weather, or to recover the airship if the tether breaks. However, the propulsion system is not sized to hold the airship's position against moderate or strong winds—the tether holds the airship in position when it is producing and transmitting power. Use of a smaller, less capable propulsion system reduces cost and weight compared to a pure free-flyer, but gives more operational flexibility than an embodiment with only a tether.

In other embodiments, the airborne platform may further include apparatus to repair the solar power generation system or the airship while airborne. This may be in the form of a robotic arm or other apparatus that is controlled, e.g. from a terrestrial control station when needed.

The system configuration may be chosen based upon the location of use and the existing infrastructure. Likewise, the decision of what parameter values to assign for each system element-such as altitude, method of propulsion, particular PV cell technology, and peak capacity of the solar power generation system—depends on the particular application.

Another aspect of the present disclosure provides a method for providing electric power having a low environmental impact, comprising the steps of: providing an airship including a solar power generation system and a microwave transmission system; releasing the airship from its mooring; controlling the flight of the airship to reach and maintain a desired location; orienting the solar power generation system to maximize power output; aiming the microwave power transmission system at a microwave power receiver and transmitting that power to the microwave power receiver. The power output is then converted for use in local infrastructure or by a remote consumer. The method further includes retrieving and landing the airship as needed for maintenance or upgrades.

This method may be adapted to any of the embodiments described above. For instance, the airship may be controlled from a control station located at the Earth's surface. Once reaching an operating altitude, the solar power generation system, e.g., a PV cell array, may be oriented by steering the airship itself or by manipulating steering elements which control the azimuth and or elevation angle of the solar power generation system. This orientation may be done by an operator, who may be located at a control station, or may be accomplished automatically.

The system of the present disclosure provides a power source that is not fixed to one location. Once aloft, an airship can be controlled to navigate to nearly any desired location. At its destination, the microwave transmitter is oriented to the desired location of a microwave receiver, and power begins to flow to the user without burning fuel. The expensive parts of the system are airborne, above the reach of hostile car bombs, RPGs, and small arms fire.

It should be emphasized that the above-described embodiments of the present disclosure, particularly, any "preferred" embodiments, are merely possible examples of implementations, merely set forth for a clear understanding of the principles of the airborne power station. Many variations and modifications may be made to the above-described embodiments without departing substantially from the spirit and principles of the disclosure. For instance, the airborne platform may be provided with a transponder or beacon to facilitate air traffic control to avoid potential problems. Also, the tether or power cables, if used, may further include lights. All such modifications and variations are intended to be included herein within the scope of this disclosure and protected by the following claims.

What is claimed is:

1. A system for converting sunlight to electricity comprising:
    an airborne platform,
    a solar power generation system supported by the airborne platform and held in a spaced relationship to the airborne platform, wherein the solar power generation system is suspended below the airborne platform by at least one vertically-positioned rigid arm, and wherein the solar power generation system is movable relative to the airborne platform;
    and a microwave transmission system for transmitting power to at least one microwave receiver stations.

2. The system of claim 1, wherein the airborne platform further comprises an airship.

3. The system of claim 2, wherein the airship includes at least one of a propulsion and a steering element for orienting the airship and for stabilizing the airship in position.

4. The system of claim 3, further comprising a control station for operating the propulsion and/or steering elements.

5. The system of claim 1, wherein the solar power generation system includes a plurality of steerable solar energy collection panels.

6. The system of claim 1, wherein the microwave transmission system includes a microwave transmitter that is capable of being aimed substantially directly at the at least one microwave receiver station.

7. The system of claim 1, wherein the at least one microwave receiver station is located at the Earth's surface.

8. The system of claim 1, wherein the at least one microwave receiver station is mobile.

9. The system of claim 1, wherein the microwave receiver station includes a converter for converting the transmitted power for use with a local distribution system.

10. The system of claim 1, wherein the converter for converting the transmitted power is a rectenna.

11. The system of claim 1, wherein the solar power generation system is comprised of individual photovoltaic arrays and the microwave transmission system is comprised of individual microwave transmit modules, and wherein individual photovoltaic arrays are arranged abutting individual microwave transmit modules.

12. The system of claim 1, further comprising a tether connected to the airborne platform at one end, and connected to a mooring device at the Earth's surface at another end.

13. The system of claim 1, wherein the solar power generation system and the microwave transmission system are electrically connected.

14. A method for providing electric power, comprising the steps of:
    providing an airship including a solar power generation system and a microwave transmission system;
    releasing the airship from its mooring;
    controlling flight of the airship to reach and maintain a desired location;
    orienting the solar power generation system to substantially maximize power output, wherein the solar power generation system is suspended below the airborne platform by at least one vertically-positioned arm, and wherein the solar power generation system is movable relative to the airborne platform;
    aiming the microwave power transmission system at a microwave power receiver;
    and transmitting power to the microwave power receiver.

15. The method of claim 14, further comprising converting the transmitted power for consumer use.

16. The method of claim 14, further comprising retrieving and landing the airship.

17. The method of claim 14, further comprising the steps of:
    distributing power from the solar power generation system by a power management and distribution system to at least one of a propulsion and steering system, a communication system, and a storage system, and;
    using the power in the storage system is used to operate the propulsion and steering system when solar power is unavailable.

* * * * *